Patented June 30, 1925.

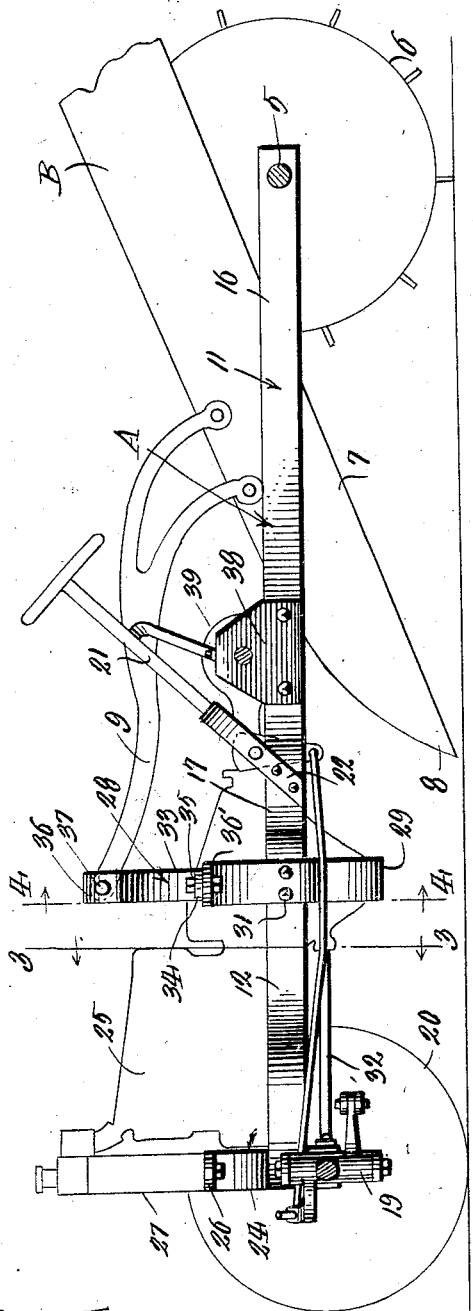

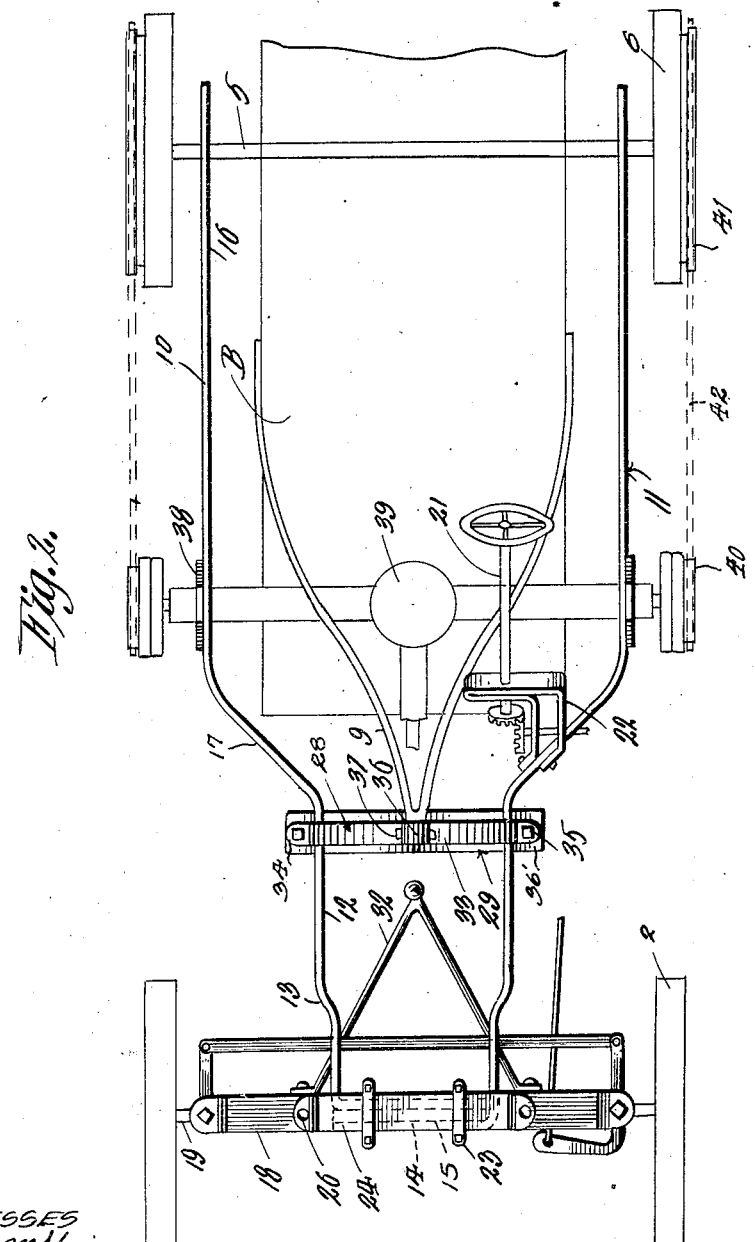

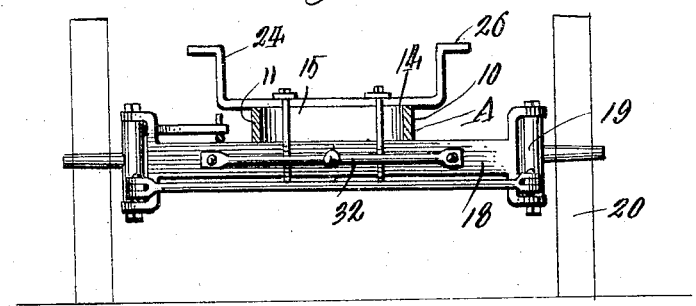
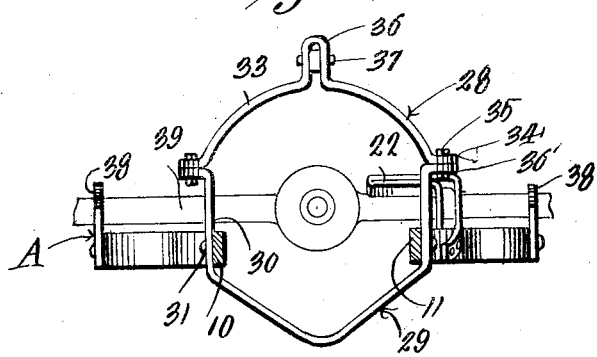

1,544,541

UNITED STATES PATENT OFFICE.

LESTER R. LEE, OF PRESQUE ISLE, MAINE.

FRAME ATTACHMENT FOR POTATO DIGGERS.

Application filed September 23, 1924. Serial No. 739,442.

*To all whom it may concern:*

Be it known that I, LESTER R. LEE, a citizen of the United States, residing at Presque Isle, in the county of Aroostook and State of Maine, have invented certain new and useful Improvements in Frame Attachments for Potato Diggers, of which the following is a specification.

This invention appertains to farming machines and more particularly to a novel tractor device for connection with farm implements such as potato harvesters or diggers and the like.

The primary object of the present invention is to provide a novel frame for permitting the expeditious connecting of a potato digger with a drive engine, whereby the potato digger can be effectively operated over a field without the use of draft animals or tractors.

A further object of the invention is the provision of a novel wheeled frame for supporting the drive engine, transmission and associate parts thereof and the forward end of the digger for permitting the ready connection of the drive wheels of the digger with the transmission.

A further object of the invention is to provide a novel frame in which the forward end of the digger is adapted to fit, the frame receiving a supporting axle for the digger, and a novel brace carried by the frame for supporting the engine and for receiving the forward or front beams of the digger, the rear drive wheels being fitted close to the frame whereby the device can conveniently ride between rows of vegetation.

A still further object of the invention is to provide an improved frame for the purpose specified, which will be durable and efficient in use, one that will be simple and easy to manufacture and one which can be placed upon the market at a small cost.

With these and other objects in view, the invention consists in the novel construction, arrangement and formation of parts, as will be hereinafter more specifically described, claimed, and illustrated in the accompanying drawings, in which drawings, Figure 1 is a side elevation of the improved frame, showing parts thereof broken away and in section and illustrating the means of connecting the drive engine and associate parts and the digger thereto.

Figure 2 is a top plan view of the same,

Figure 3 is a transverse section through the frame taken on the line 3—3 of Figure 1 looking in the direction of the arrows, Figure 4 is a transverse section through the same taken on the line 4—4 of Figure 1 looking in the direction of the arrows, illustrating the novel form of brace for receiving the rear end of the engine and the forward end of the lift or front beams of the digger.

Referring to the drawings in detail, wherein similar reference characters designate corresponding parts throughout the several views the letter A generally indicated the improved frame and B the digger which is to be associated therewith.

The digger B is of the usual or any preferred construction and can be of the type placed upon the market by the Hoover Manufacturing Company and as shown includes the usual elevator frame 7, plow 8 and the forwardly extending lift or front beams 9 to which the front truck is ordinarily connected.

The improved frame A includes a pair of side beams 10 and 11 which can be formed of any desired material possessing the necessary tensile strength. The beams 10 and 11 include front parallel portions 12, which are offset as at 13 and integrally connected together by a front bar 13, which can consist of overlapped extensions 15. The rear ends of the beams 10 and 11 include elongated spaced parallel portions 16 which are connected to the parallel portions 12 by inwardly diverging connecting portions 17. By the arrangements it can be seen that the frame includes a relatively large rear portion and a relatively small front narrow portion. The front bar 14 supports any preferred type of dead axle 18, the terminals of which carry steering knuckles 19 for the front steering wheels 20. A suitable steering mechanism 21 is provided for operating the steering knuckles and this mechanism can be of any preferred conventional type. As shown the steering post 21 is supported by a bracket 22 secured to the frame A. The extreme forward end of the frame has bolted thereto as at 23 a transversely extending U-shaped cross brace 24 on which the forward end of the drive engine indicated by the reference character 25 is adapted to be placed. The terminals of the cross brace 24 are provided with seats 26 on which can be bolted a conventional type of radiator 27 for the cooling system of the drive engine 25. The portions 12 of the side beams 10 and 11 support a novel transversely extending frame 28 which forms an important part of this invention. This frame 28 includes a lower substantially V-shaped section 29 provided with upstanding arms 30 which are bolted or otherwise secured as at 31 to said portions 12 adjacent to the converging portions 17 of the frame A. This section 29 receives and supports the rear end of the drive engine 25, that is the fly wheel case thereof and the engine and frame is further braced by conventional radius rods 32. The transverse frame 28 also includes a bow-shaped upper section 33 the terminals of which are provided with laterally extending feet 34 which are bolted or otherwise secured as at 35 to laterally extending seats 36′ formed on the upstanding arms 30 on the lower section 29. The central portion of the bowed upper section 33 of the transversely extending frame 29 is provided with an upstanding struck out yoke 36 which is arranged at the longitudinal center of the main frame A. This yoke 36 receives the forward end of the lift or front beam 9 of the potato digger B and the lift or front beam 9 is secured in place by means of a pivot bolt 37. Now it is to be noted that the rear end of the frame receives or straddles the forward end of the potato digger B and that the rear terminals of the portions 16 of the bars 10 and 11 of the main frame A supports an axle 5 for the said potato digger, on which are fitted the drive wheels 6. By this construction it is obvious that the potato digger can be readily connected to the frame and that the frame will form a continuation thereof.

Supporting blocks 28 are bolted or otherwise secured to the beams 10 and 11 adjacent to the converging portions 17 thereof and these blocks 28 support the transmission housing 29 of the drive mechanism. Now it is to be understood that the drive axles of the transmission are to be connected in any desired way to the drive wheels 6 and as shown drive wheels 40 are fitted on the outer ends of the drive axles of the transmission and these sprocket wheels are arranged in longitudinal alignment with sprocket wheels 41 secured to the drive wheels 6. Sprocket wheels 32 are trained about the sprocket wheels 40 and 41. By this construction it can be seen that a novel drive has been provided. A seat is so arranged on the frame A as to permit the operator to control both the operation of the digger and the drive mechanism therefor and it is to be understood that extensions can be made for the foot pedals to permit the convenient operation thereof from the driver's seat.

From the foregoing description, it can be seen that I have provided an improved frame which will permit the convenient connection of a conventional potato digger with a drive mechanism, whereby the potato digger can be operated over a field without the use of draft animals or a power plant carried by the digger itself.

Changes as to details may be made without departing from the spirit or the scope of this invention, but what I claim as new is:—

1. The combination with a conventional potato digger including a forwardly extending lift beam, of a wheeled frame for supporting a drive engine for the digger including a pair of spaced side beams arranged to receive the forward end of the digger therebetween, the rear ends of the beams supporting an axle for the digger, a transversely extending frame carried by the side beams for supporting the rear end of the crank case of the drive engine, and means for securing the forward end of the lift beam to the said transversely extending frame.

2. The combination with a conventional potato digger including a forwardly extending lift beam, of a frame therefore including spaced side beams arranged to receive the potato digger therebetween, the rear terminals of the side beams receiving an axle for the digger, a front engine support carried by the forward end of the frame, a rear support for the engine carried by the frame arranged in rear of the front engine support including an upper bow-shaped section, means for detachably securing the lift beam to the central portion of said upper bow section, and transmission supporting blocks carried by the side beams in rear of said rear support for the engine.

3. As a new article of manufacture, a drive attachment for farm implements comprising a frame including spaced side bars including rear parallel portions arranged to receive a potato digger therebetween, said rear portions being spaced a relatively great distance, and front parallel portions spaced a less distance than said rear parallel portions, a dead axle secured to the front end of the frame, steering wheels carried by the dead axle, U-shaped front support for receiving the front end of the engine, a rear support for receiving the rear end of the engine including a lower substantially V-shaped section upon which the rear end of the engine is adapted to rest, upstanding arms formed on the lower section secured to the side bars, an upper bow transversely extending section secured to the lower section, an upstanding yoke formed on the upper bow shaped section for receiving the lift beam of the farm implement.

4. A frame for the purpose specified comprising a pair of spaced side bars including an enlarged rear section, a transversely extending front support for receiving the front end of an engine, a transversely extending rear support including a V-shaped lower section secured to the side beam for supporting the rear end of the engine and an upper bow shaped section, an upstruck yoke formed on the central portion of the upper bow section, bearing blocks carried by the enlarged portion of the frame in rear of the rear support for supporting a transmission, a rear drive axle, drive wheels on the axle fitted close to the frame, sprocket wheels carried by the terminals of the transmission shaft, sprocket wheels connected with the drive wheels and sprocket chains trained about said sprocket wheels.

In testimony whereof I affix my signature in the presence of two witnesses.

LESTER R. LEE.

Witnesses:
J. W. LOANE,
PAULINE CHASE.